(12) United States Patent
Sasaki

(10) Patent No.: US 7,412,779 B2
(45) Date of Patent: Aug. 19, 2008

(54) MEASURING TOOL

(75) Inventor: Kouji Sasaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 12/000,170

(22) Filed: Dec. 10, 2007

(65) Prior Publication Data
US 2008/0134534 A1  Jun. 12, 2008

(30) Foreign Application Priority Data
Dec. 12, 2006  (JP) .............................. 2006-334400

(51) Int. Cl.
*G01B 3/00* (2006.01)
*G01B 5/00* (2006.01)
(52) U.S. Cl. .............................. 33/556; 33/559; 33/503
(58) Field of Classification Search .................. 33/556, 33/558, 549, 551, 553, 558.3, 558.4, 559, 33/561, 503, 504
See application file for complete search history.

(56) References Cited
U.S. PATENT DOCUMENTS
7,100,429 B2 * 9/2006 Matsuki et al. ............... 33/556
7,207,119 B1 * 4/2007 Eleftheriou et al. ........... 33/551
7,367,132 B2 * 5/2008 Mitsuhashi ................... 33/556
7,376,261 B2 * 5/2008 Noda et al. ................... 33/556
2004/0040373 A1 * 3/2004 Saito ........................... 33/558

FOREIGN PATENT DOCUMENTS
JP  Y2-02-045762  12/1990

* cited by examiner

*Primary Examiner*—Yaritza Guadalupe-McCall
(74) *Attorney, Agent, or Firm*—Oliff & Berridge, PLC

(57) ABSTRACT

In a measuring tool, following operations are carried out. In a preset operation, a displacement is detected in response to an instruction from an operating section, and the detected displacement is stored in a storage as a measurement reference value ($X_c$). In a measurement value computing operation, a measurement value is calculated based on a difference between the present displacement and the measurement reference value ($X_c$). A judgment operation belongs to the preset operation. In the judgment operation, a movable member is judged to be stationary relative to a stationary member when a variation of the displacement detected by the detector at an interval of a predetermined time ($T_1$) has continuously been within a permissible range for a predetermined time. When the movable member is judged to be stationary with respect to the stationary member in the judgment operation, the displacement is stored in the storage as a measurement reference value ($X_c$).

3 Claims, 7 Drawing Sheets

MEASURING TOOL

BACKGROUND OF THE INVENTION

1. Field of the Invention

The present invention relates to a measuring tool for measuring a displacement of a movable member relative to a stationary member.

2. Description of Related Art

Calipers, micrometers, indicators, test indicators, height gauges, and scales are known as digital measuring tools for measuring dimensions and the like of an object. Such measuring tools are provided with a stationary member, a movable member arranged movable relative to the stationary member, a detector for detecting a displacement of the movable member relative to the stationary member, and a display for displaying the displacement of the movable member relative to the stationary member detected by the detector.

For example, as shown in FIG. 1, a test indicator 1 includes: a body 10; a stylus 11 penetrating the body 10 and supported swingable around a supported portion 111; an encoder 12 having an electrode 121 provided to a closer end to the body 10 of the stylus 11 and a detector head 122 which is provided to the body 10 and electrostatically coupled with the electrode 121 to detect a displacement of the stylus 11 relative to the body 10; a display 13 for digitally displaying the displacement of the stylus 111 relative to the body 10 detected by the encoder 12; and an operating section 15 for a so-called preset operation.

The test indicator 1 arranged such is a measuring tool for measuring a height and the like of an object 2 from a displacement of the stylus 11 obtained when a contact portion 112 provided to an end of the stylus 11 is contacted to the object 2.

The test indicator 1 can also work out a comparison and the like of a plurality of objects by carrying out the preset operation.

In order to compare heights of two objects, firstly, the contact portion 112 of the stylus 11 is brought into contact with an upper surface of one object, and the operating section 15 is operated. The displacement then of the stylus 11 is stored as a measurement reference value. Next, the contact portion 112 of the stylus 11 is contacted to the upper surface of the other object. Consequently, the difference between the displacement of the stylus 11 at this time and the measurement reference value previously stored is displayed on the display 14, thereby enabling comparison between the heights of the two objects.

As an example of such an indicator, there is disclosed a test indicator which has a detector that electrically senses a moire fringe generated by a displacement of a stylus enabling a precise measurement (Patent Document: JP-UM-B-02-45762).

However, a conventional test indicator such as one in Patent Document can not precisely determine a measurement reference value since an operating section for handling a preset operation is provided to the body.

This problem will be described with reference to FIGS. 5 to 7.

In FIGS. 5 to 7, the horizontal axis represents time, and the vertical axis represents a displacement of the stylus. The curve shows the displacement of the stylus that occurs during the preset operation. An operation state and a stored measurement reference value are illustrated in a timing chart under the curve.

FIG. 5 shows a displacement of the stylus 11 during the preset operation with a conventional test indicator 1.

A preset operation starts with bringing the stylus 11 into a stationary state by, for example, contacting the contact portion 112 of the stylus 11 to the object. The stationary state marks time point $t_0$. Next, an operating section 15 of the body 10 is operated. The operation marks time point $t_1$.

As illustrated by a curve in FIG. 5, since the stylus 11 is stationary from $t_0$ to $t_1$, the displacement remains at $y_0$. When the operating section 15 of the body 10 is operated at $t_1$, force is also transmitted to the body 10 integrated with the operating section 15 to vibrate the body 10. Since the encoder 12 detects a relative displacement of the stylus 11 with respect to the body 10, the vibration of the body 10 is sensed as a displacement of the stylus 11.

Although the measurement reference value is stored in response to the operation of the operating section 15, the storing takes place at time point $t_2$, slightly later than time point $t_1$ at which the operating section 15 has been operated. Since $t_2$ is immediately after the operation of the operating section 15, the body 10 is vibrating considerably The displacement of the stylus 11 stored as the measurement reference value is $y_1$, which is different from the displacement $y_0$ at an actually stationary position. Therefore, the stored measurement reference value includes an error equal to $y_1 - y_0$.

A well-known way to prevent such an error in the measurement reference value is to provide a time lag between the operation of the operating section 15 and the storing of the measurement reference value.

FIG. 6 illustrates the displacement of the stylus 11, the operation state of the operating section 15, and the timing of storing the measurement reference value in case of the preset operation with time lags.

FIG. 6 differs from FIG. 5 only in that a considerable time lag T is provided between $t_1$ and $t_2$. Since the vibration of the body 10 has settled at time point $t_2$ after a considerable time lag T, the displacement $y_0$ at the actually stationary position can be stored as a measurement reference value.

However, according to such a way of providing a time lag, the time lag needs to be determined longer than the time it takes for the vibration of the body 10 to settle. Since the vibration of the body 10 varies in accordance with, for example, an environmental condition, there are times when the time lag T is too long with respect to a vibration continuation time $T_0$, as shown in FIG. 6. In this case, time equivalent to $T - T_0$ is wasted, which is not preferable in terms of work efficiency.

On the other hand, as shown in FIG. 7, there are cases in which the time lag T is too short with respect to the vibration continuation time $T_0$. In this case, since the vibration of the body 10 is not settled at time point $t_2$, the displacement of the stylus 11 stored as the measurement reference value is $y_2$, which is different from the displacement $y_0$ at the actually stationary position. An error equal to $y_2 - y_0$ is inevitable.

Such an error in the measurement reference value has been found not only with test indicators but also with various measuring tools whose operating section for controlling a preset operation is provided on a body.

SUMMARY OF THE INVENTION

An object of the present invention is to provide a measuring tool that effectively excludes occurrence of an error in a measurement reference value during a preset operation.

A measuring tool according to an aspect of the present invention includes: a stationary member; a movable member arranged movable with respect to the stationary member; a detector that detects a displacement of the movable member with respect to the stationary member; a computing section that computes a measurement value from the displacement detected by the detector; a display that displays the measurement value computed by the computing section; and an operating section that gives an instruction to the computing section; in which the computing section, comprising a storage that stores the displacement detected by the detector, carries out: a preset operation in which in response to the instruction given by the operating section the displacement detected by the detector is stored in the storage as a measurement reference value and a measurement value computing operation in which a measurement reference value is computed based on a difference between the present displacement and the measurement reference value stored in the storage, and in the preset operation, judgment operation in which the movable member is judged to be stationary with respect to the stationary member when a variation of the displacement detected by the detector at an interval of a predetermined time has continuously been within a permissible range for a predetermine time is carried out, and when the movable member is judged to be stationary with respect to the stationary member in the judgment operation, the displacement is stored in the storage as the measurement reference value.

According to the aspect of the present invention, in the preset operation: a judgment operation is carried out, in which the movable member is judged to be stationary with respect to the stationary member when the variation of the displacement detected by the detector at an interval of the predetermined has continuously been within a permissible range for the predetermined time; and when the movable member is judged to be stationary with respect to the stationary member in the judgment operation, the measurement reference value is stored in the storage. Therefore, no time is wasted after the movable member settles stationary with respect to the stationary member before the measurement reference value is stored, and no measurement reference value is stored before the movable member becomes stationary with respect to the stationary member. Occurrence of an error in the measurement reference value during the preset operation is efficiently excluded, accordingly.

According to the aspect of the present invention, it is preferable that, in the measuring tool, the judgment operation comprises: a provisional reference value setting operation in which in response to the instruction given by the operating section the displacement detected by the detector is stored in the storage as a provisional measurement reference value; a continuous detection operation in which the displacement is detected by the detector at an interval of the predetermined time after the provisional reference value setting operation; a discrimination operation in which whether or not a temporal variation value that is an absolute value of the difference between the displacement detected in the continuous detection operation and the provisional reference value is within the predetermined permissible range is discriminated; and a variable changing operation in which a judgment time variable is changed based on the discrimination in the discrimination operation, and in the variable changing operation: when the temporal variation value is discriminated to be within the permissible range in the discrimination operation, the judgment time variable is changed by one unit; when the temporal variation value is discriminated not to be within the permissible range the displacement at the time is stored in the storage as a new provisional reference value and the judgment time variable is reset to a predetermined initial value; and when the judgment time variable has reached a predetermined value, the movable member is judged to be stationary with respect to the stationary member, and the provisional reference value is set as the measurement reference value.

According to the arrangement, in the judgment operation, the movable member is judged to be stationary with respect to the stationary member when the temporal variation value has continuously been within the permissible range while the judgment time variable is approaching the predetermined value. Therefore, the settlement of the vibration of the stationary member caused by the operation of the operating section can be judged appropriately. Occurrence of an error in the measurement reference value during the preset operation is efficiently excluded, accordingly.

According to the aspect of the present invention, it is preferable that the measuring tool is a test indicator or an indicator.

According to the arrangement, occurrence of an error in the measurement reference value in the test indicator can be efficiently excluded, the test indicator and indicator being especially vulnerable to the error in the measurement reference value as an operation of the operating section has a tendency to generate a displacement of the movable body relative to the stationary member.

DETAILED DESCRIPTION OF PREFERRED EMBODIMENT(S)

An embodiment of the present invention will be described below with reference to the drawings.

Figure 1:
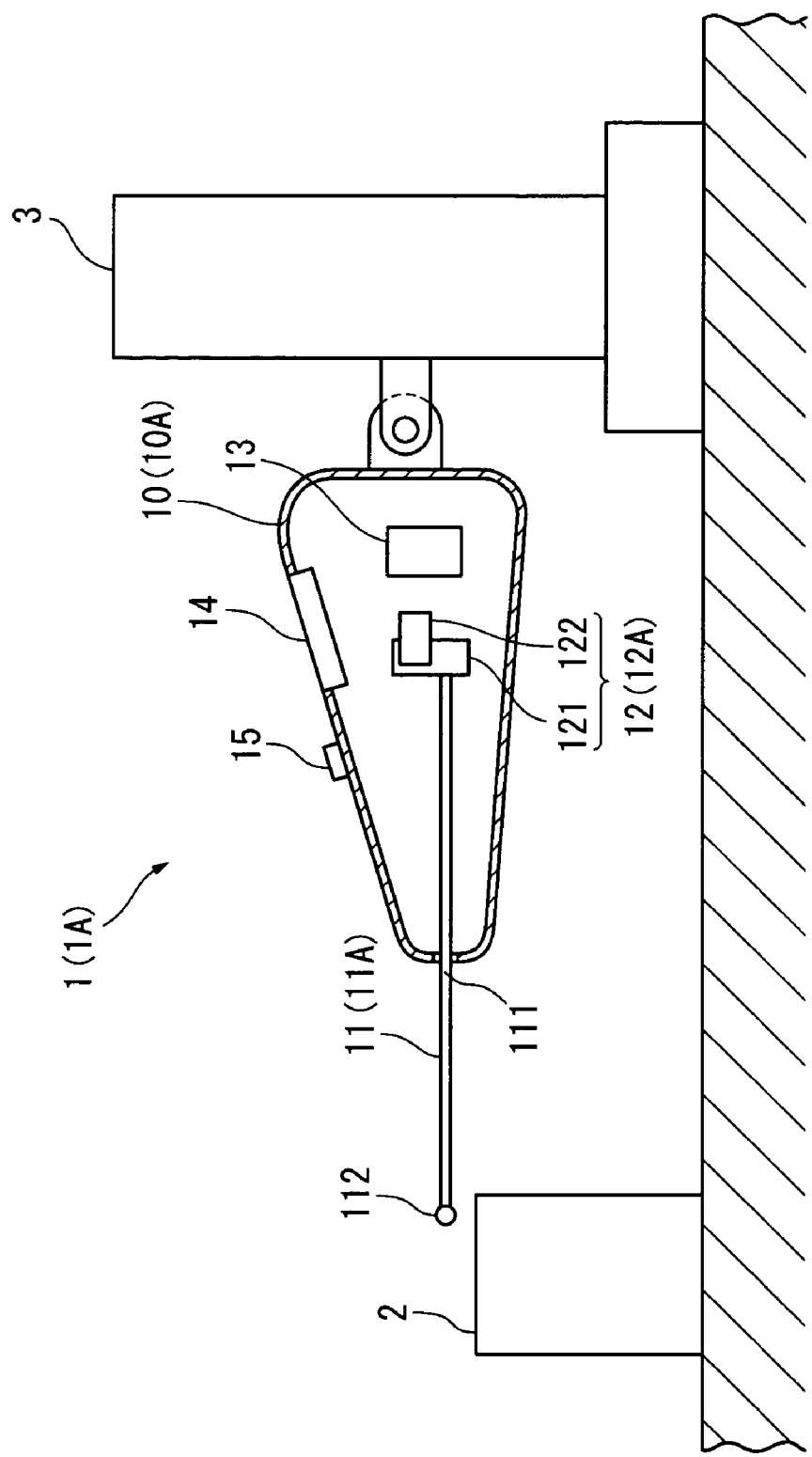
FIG. 1 is a sectional view of a measuring tool according to the present invention.

FIG. 1 shows a sectional view of a test indicator 1 which is a measuring tool 1A according to the embodiment.

As shown in FIG. 1, the test indicator 1 includes: a body 10 which is a stationary member 10A; a stylus 11 which is a movable member 11A swingably supported to the body 10; an encoder 12 which is a detector 12A for detecting a displacement of the stylus 11 relative to the body 10; a computing section 13 for computing a measurement value from the displacement of the stylus 11 relative to the body 10 detected by the encoder 12; a display 14 for displaying the measurement value computed by the computing section 13; and an operating section 15 for giving an instruction to the computing section 13.

The body 10 is a substantially oblong casing of which one end is fixed to a stand 3 and the other end supports the stylus 11. The body 10 has the display 14 and the operating section 15 on an upper side and the encoder 12 and the computing section 13 inside.

The stylus 11 penetrates through the body 10 and is swingably supported around the supported portion 111. A substantially spherical contact portion 112 to be in contact with a target portion of the object 2 is provided to an end of the stylus 11 opposite with respect to the body 10.

The encoder 12 includes: an electrode 121 provided to an end of the stylus 11 adjacent to the body 10; and a detector head 122 provided to the body 10 electrostatically coupled with the electrode 121 to detect the displacement of the stylus 11.

The display 14 is a liquid crystal display device that digitally displays a measurement value calculated by the computing section 13. The operating section 15 is a pressing button that gives an instruction to the computing section 13.

Figure 2:
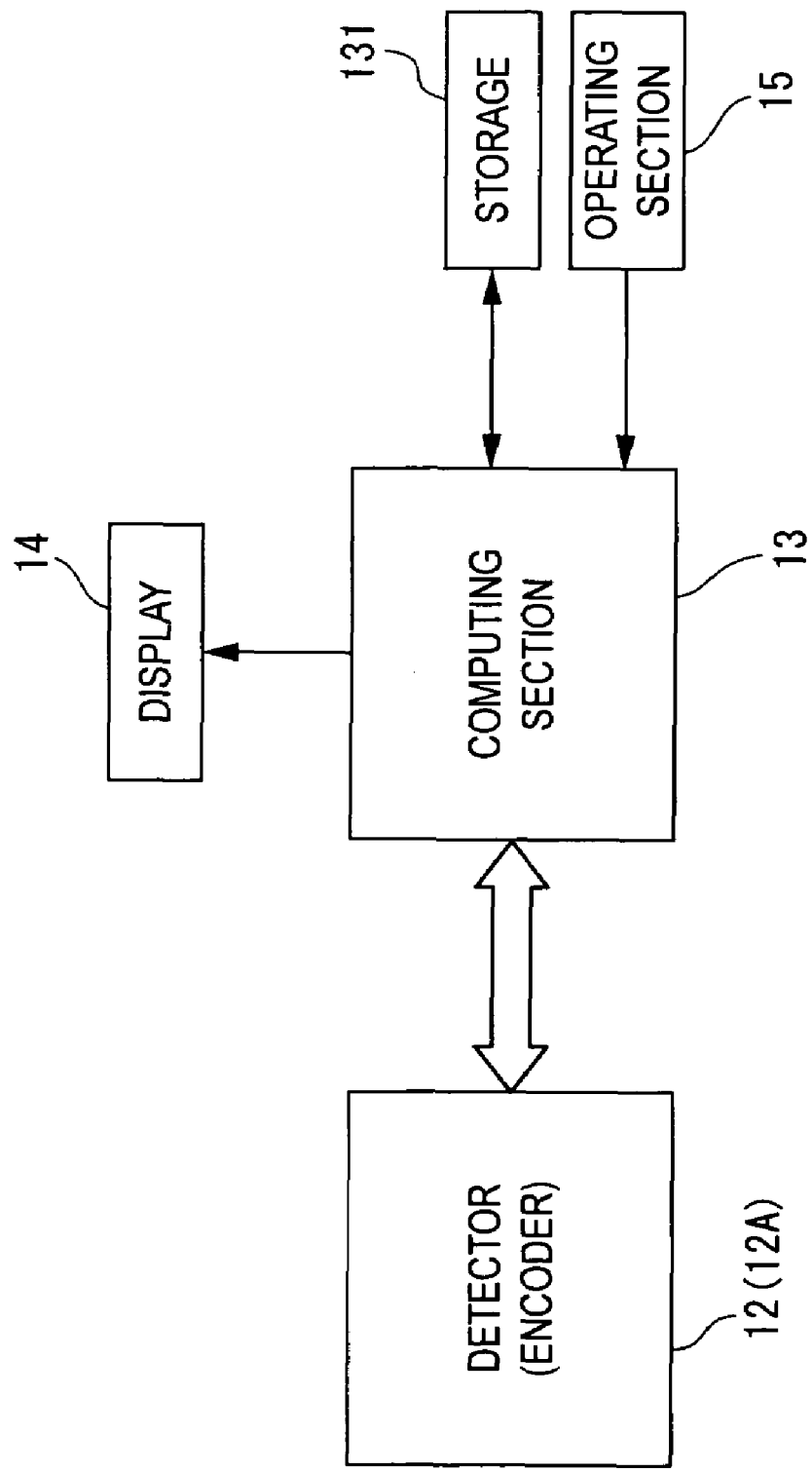
FIG. 2 is a diagram showing an internal arrangement of the measuring tool according to the embodiment.

FIG. 2 shows an internal arrangement of the test indicator 1.

As shown in FIG. 2, the computing section 13 is connected to the encoder 12, the display 14, and the operating section 15. The computing section 13 also includes a storage 131 for storing the displacement detected by the encoder 12.

In the computing section 13, a preset operation in which a displacement is detected by the encoder 12 in response to an instruction from the operating section 15 and the detected displacement is stored as a measurement reference value in the storage 131, and a measurement computation operation in which a measurement value is calculated based on a difference between the present displacement and the measurement reference value stored in the storage 131 are carried out.

In the preset operation, a judgment operation is carried out, in which the stylus 11 is judged to be stationary with respect to the body 10 when a variation of the displacement detected by the encoder 12 at a predetermined interval has continuously been within a permissible range for a predetermined time. Also in the preset operation, when the stylus 11 is judged to be stationary with respect to the body 10, the displacement is stored as a measurement reference value in the storage 131.

Figure 3:
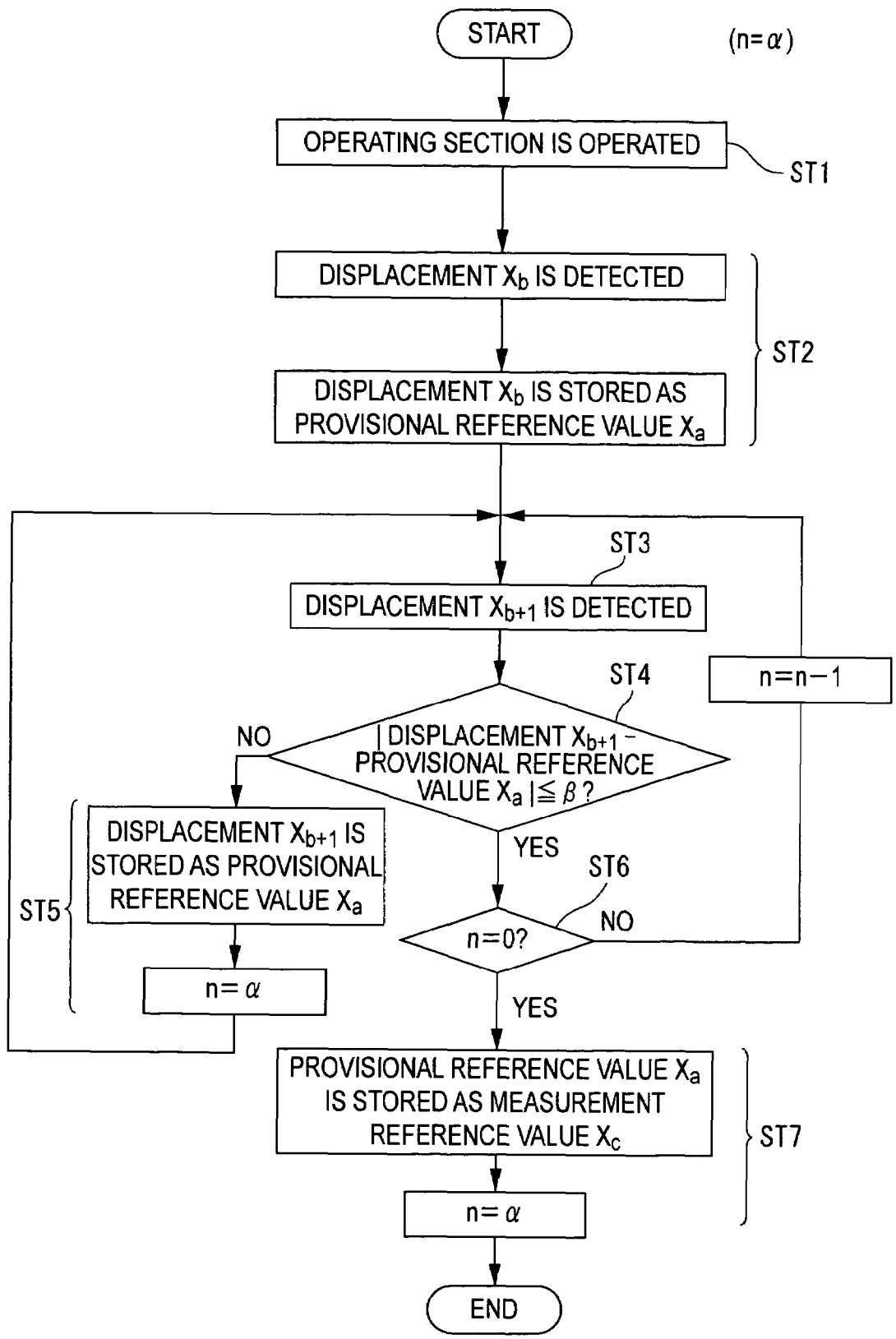
FIG. 3 is a schematic diagram of a preset operation of the measuring tool according to the embodiment.

FIG. 3 schematically illustrates the preset operation. Note that the judgment time variable n=α (natural number) in the initial state.

To start a preset operation, at ST1, the operating section 15 is operated to give an instruction to the computing section 13 to start the preset operation. Consequently, the judgment operation (operations ST 2 to ST6), in which whether the stylus 11 is stationary relative to the body 10 or not is judged, is initiated.

At ST2, the computing section 13, given an instruction by the operating section 15, prompts the encoder 12 to detect the displacement and the storage 131 to store the detected displacement $X_b$ as a provisional reference value $X_a$ (provisional reference value setting operation).

After standing-by for a predetermined time, at ST3, a displacement $X_{b+1}$ is detected by the encoder 12. ST3 is repeated at an interval of a predetermined Time $T_1$ until the judgment operation is over (continuous detection operation).

At ST4, whether the temporal variation value, which is an absolute value of a difference between the displacement $X_{b+1}$ and the provisional reference value $X_a$, is within a predetermined permissible range, that is, equal to or less than β, is judged (judgment operation). Should the judgment be a NO, ST5 is executed, and should the judgment be an YES, ST6 is executed.

At ST5, the displacement $X_{b+1}$ is stored as a new provisional reference value $X_a$, and the judgment time variable n is reset to a predetermined initial value α. Subsequently, when the predetermined time $T_1$ passes after the execution of ST3, ST3 and the following operations are repeated.

At ST6, a judgment is made on whether or not the judgment time variable n=0.

Should the judgment be a NO, the judgment time variable is decremented by one unit (n=n-1). That is, in the embodiment, one is subtracted from the judgment time variable n and the remainder (natural number) is set as a new judgment time variable n. Subsequently, when the predetermined time $T_1$ passes after the execution of ST3, ST3 and the following operations are repeated.

Should the judgment be an YES, since the judgment time variable n has reached a predetermined value (i.e. 0), the stylus 11 is judged to be stationary relative to the body 10 and ST7 is performed. The judgment operation includes a series of the operations ST 2 to ST6.

At ST7, a provisional reference value $X_a$ is stored as a measurement reference value $X_c$, and the judgment time variable n is reset to the predetermined initial value α. The preset operation ends here.

After the preset operation is carried out, the computing section 13 calculates $X-X_c$, that is, the difference between the present displacement X and the measurement reference value $X_c$ stored in the storage 131 (measurement computation operation), which is displayed as a measurement value $X_d$ by the display 14.

Figure 4:
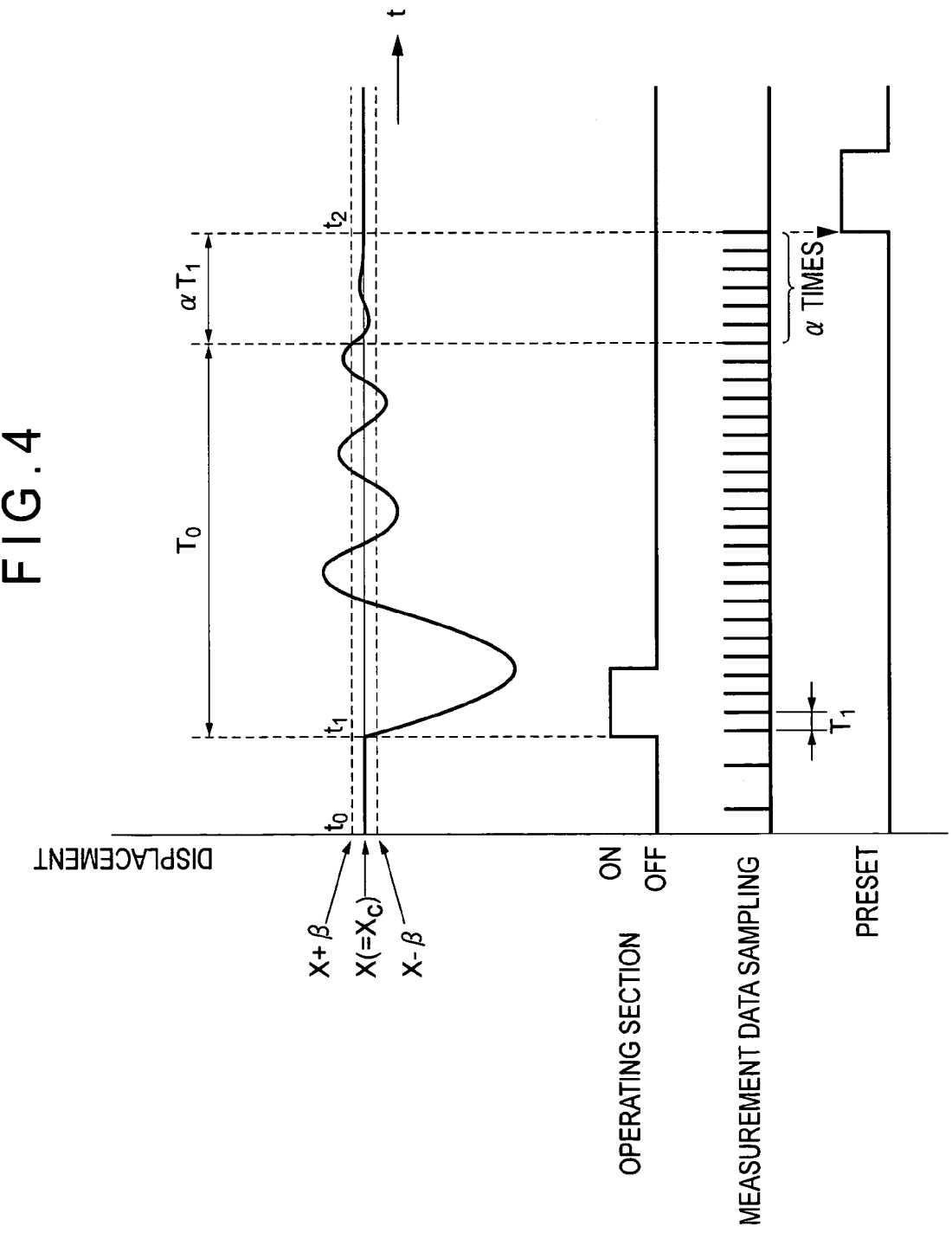
FIG. 4 is a diagram showing a displacement of a stylus during the preset operation according to the embodiment.
Figure 5:
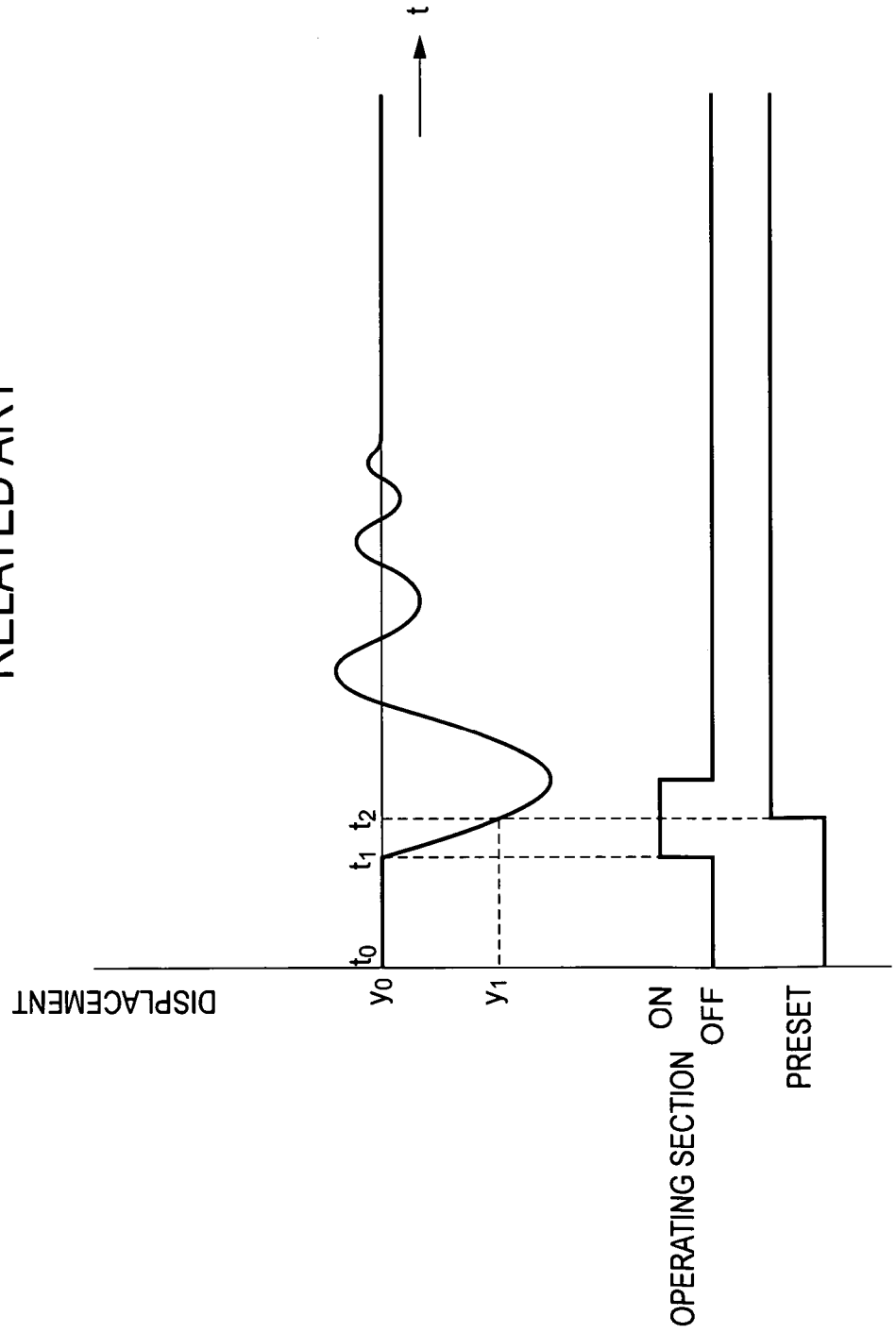
FIG. 5 is a diagram showing a displacement of a stylus during a preset operation of a conventional test indicator.
Figure 6:
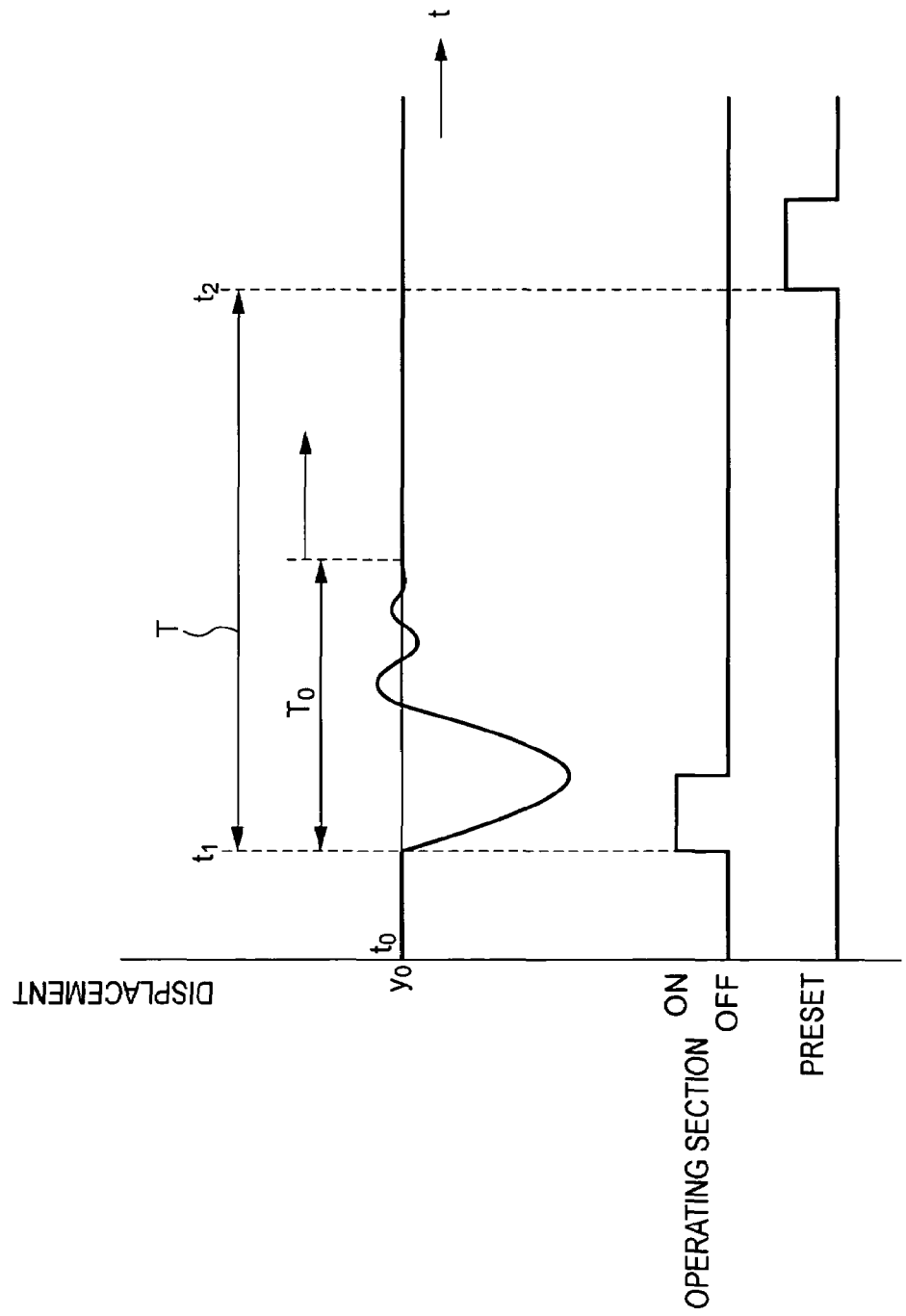
FIG. 6 is a diagram showing a displacement of the stylus during a preset operation with a time lag of the conventional test indicator.
Figure 7:
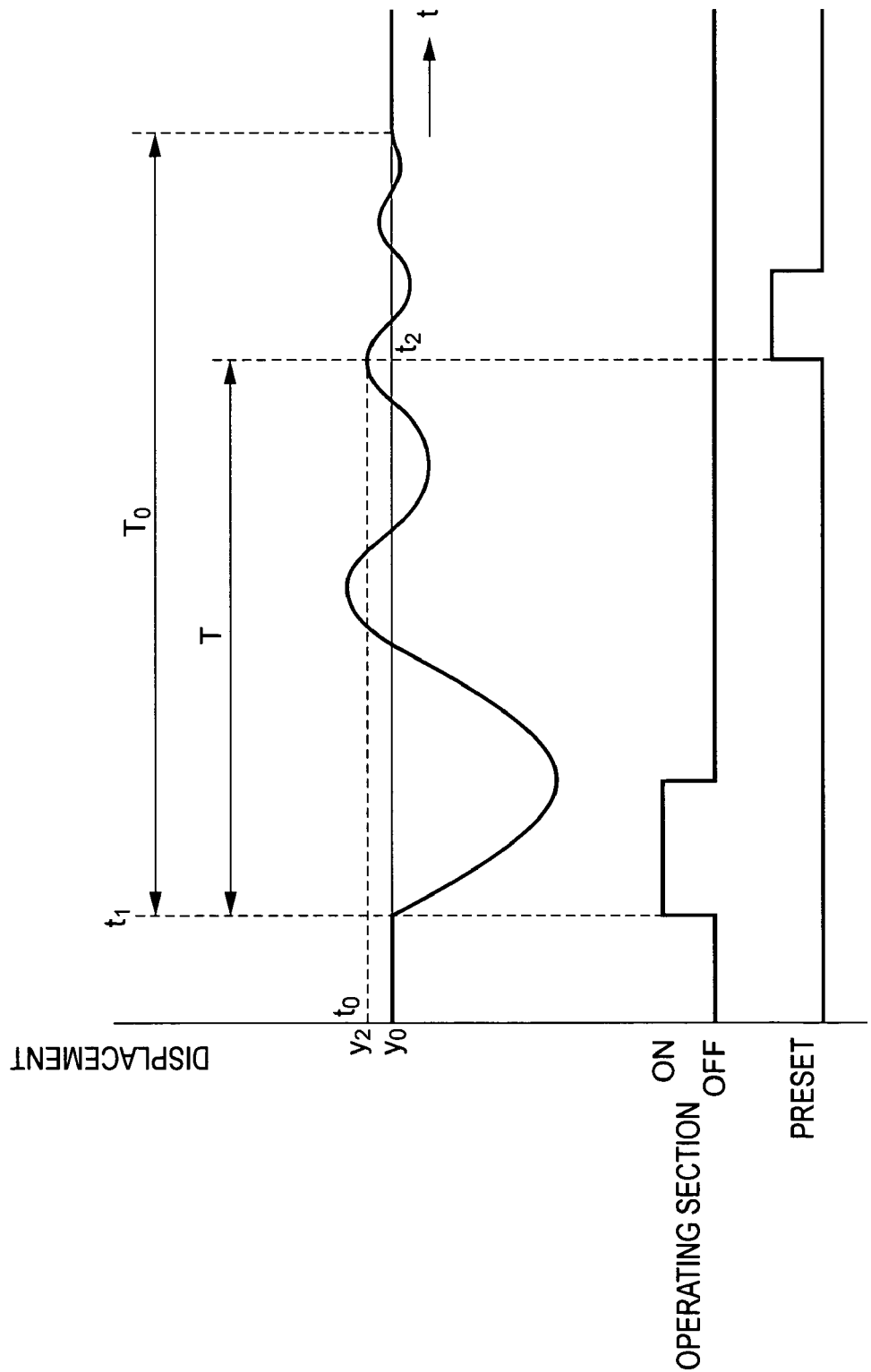
FIG. 7 is a diagram showing a displacement of the stylus during a preset operation with another time lag of the conventional test indicator.

FIG. 4 shows a displacement of the stylus 11 in the preset operation for the test indicator 1.

In FIG. 4, the horizontal axis represents time, the vertical axis represents the displacement of the stylus 11, and the curve represents the displacement of the stylus 11 that occurs during the preset operation. Shown under the curve illustrating the displacement of the stylus 11 are an operation status of the operating section 15, an operating status of the continuous detection operation and a timing at which the measurement reference value $X_c$ is stored.

To start a preset operation, first the stylus 11 is made stationary by, for example, contacting the contact portion 112 of the stylus 11 to the object 2. The operation marks time point $t_0$. Next, an operating section 15 of the body 10 is operated. The operation marks time point $t_1$.

As illustrated by a curve in FIG. 4, since the stylus 11 is stationary from $t_0$ to $t_1$, the displacement stays at X. When the operating section 15 of the body 10 is operated at $t_1$, force is also transmitted to the body 10 integrated with the operating section 15 to vibrate the body 10. Because the encoder 12 detects a relative displacement of the stylus 11 with respect to the body 10, the vibration of the body 10 is sensed as a displacement of the stylus 11.

When the operating section 15 is operated at $t_1$, the continuous detection operation is executed after the provisional reference value setting operation, as described with reference to FIG. 3. The continuous detection operation is carried out at an interval of a predetermined time T1. After the continuous detection operation, the judgment operation is executed.

Around the time when time $T_0$ has passed after the operation of the operating section 15, since the vibration of the body 10 has almost settled, the displacement of the stylus 11 detected by the encoder 12 has approached the initial value X. As the displacement of the stylus 11 falls within the range X−β to X+β, the judgment time variable n starts to be decremented. After α times of counting, the provisional reference value $X_a$, determined when the first counting took place, is stored as the measurement reference value $X_c$.

Therefore, time required from the operation of the operating section 15 to the storage of the measurement reference value $X_c$ is approximately $T_0+\alpha T_1$.

Effects of the embodiment will be described below.

(1) In a preset operation, a judgment operation is carried out, in which the stylus 11 is judged to be stationary with respect to the body 10 when a variation of a displacement detected by the encoder 12 at an interval of a predetermined time T1 has continuously been within a permissible range (equal to or less than β) for a predetermined time $\alpha T_1$. When the stylus 11 is judged to be stationary with respect to the body 10 in the judgment operation, a measurement reference value $X_c$ is stored in the storage. Therefore, no time is wasted after the stylus 11 settles stationary with respect to the body 10 and before the measurement reference value $X_c$ is stored, and no measurement reference value $X_c$ is stored before the stylus 11 settles stationary with respect to the body 10. Occurrence of an error in the measurement reference value $X_c$ during the present operation is efficiently avoided.

(2) In the judgment operation, the stylus 11 is judged to be stationary with respect to the body 10 when a temporal variation value has continuously been within the permissible range (equal to or below β) while the judgment time variable n is approaching the predetermined value 0. Therefore, the settlement of the vibration of the body 10 caused by the operation of the operating section 15 can be appropriately judged, so that occurrence of an error in the measurement reference value $X_c$ during the preset operation is efficiently avoided.

(3) Occurrence of an error in the measurement reference value $X_c$ in the test indicator 1, which is especially vulnerable to an error in the measurement reference value $X_c$ because the body 10 tends to vibrate when the operating section 15 is operated, can be effectively excluded.

It should be noted that the present invention is not limited the above embodiment, but includes other arrangements that can achieve an object of the present invention. Modifications described below are also included in the present invention.

(i) The measuring tool 1A is not limited to the test indicator illustrated in the above embodiment. For example, the measuring tool may be a caliper, a micrometer, an indicator, a height gauge, a scale and the like. The present invention can be applied to these measuring tools in the same way to the embodiment to exclude an error in the measurement reference value.

(ii) The detector 12A is not limited to the electrostatic capacitance encoder 12 mentioned in the above embodiment. The detector 12A may be anything that can detect the displacement of the movable member 11A relative to the stationary member 10A, which may be an electromagnetic induction encoder, an optical encoder and the like.

(iii) The display 14 is not limited to the liquid crystal display device mentioned in the above embodiment. The display 14 may be anything that can display the measurement value calculated by the computing section, which may be a display using organic or inorganic luminescence and the like.

The priority application Number JP 2006-334400 upon which this patent application is based is hereby incorporated by reference.

What is claimed is:

1. A measuring tool comprising: a stationary member;
a movable member arranged movable with respect to the stationary member;
a detector that detects a displacement of the movable member with respect to the stationary member;
a computing section that computes a measurement value from the displacement detected by the detector;
a display that displays the measurement value computed by the computing section; and
an operating section that gives an instruction to the computing section; wherein
the computing section, which comprises a storage that stores the displacement detected by the detector, carries out:
a preset operation in which in response to the instruction given by the operating section the displacement detected by the detector is stored in the storage as a measurement reference value and a measurement value computing operation in which a measurement reference value is computed based on a difference between the present displacement and the measurement reference value stored in the storage, and
in the preset operation,
a judgment operation in which the movable member is judged to be stationary with respect to the stationary member when a variation of the displacement detected by the detector at an interval of a predetermined time has continuously been within a permissible range for a predetermined time is carried out, and
when the movable member is judged to be stationary with respect to the stationary member in the judgment operation, the displacement is stored in the storage as the measurement reference value.

2. The measuring tool according to claim 1, wherein the judgment operation comprises:
a provisional reference value setting operation in which in response to the instruction given by the operating section the displacement detected by the detector is stored in the storage as a provisional measurement reference value;
a continuous detection operation in which the displacement is detected by the detector at an interval of the predetermined time after the provisional reference value setting operation;
a discrimination operation in which whether or not a temporal variation value that is an absolute value of the difference between the displacement detected in the continuous detection operation and the provisional reference value is within the predetermined permissible range is discriminated; and
a variable changing operation in which a judgment time variable is changed based on the discrimination in the discrimination operation, and in the variable changing operation:
when the temporal variation value is discriminated to be within the permissible range in the discrimination operation, the judgment time variable is changed by one unit;
when the temporal variation value is discriminated not to be within the permissible range, the displacement at the time is stored in the storage as a new provisional reference value and the judgment time variable is reset to a predetermined initial value; and
when the judgment time variable has reached a predetermined value, the movable member is judged to be stationary with respect to the stationary member, and the provisional reference value is set as the measurement reference value.

3. The measuring tool according to claim 1, wherein the measuring tool is a test indicator or an indicator.

* * * * *